United States Patent
Kim et al.

(10) Patent No.: US 10,493,815 B2
(45) Date of Patent: Dec. 3, 2019

(54) COOLING FAN CONTROL METHOD FOR VEHICLE

(71) Applicants: Hyundai Motor Company, Seoul (KR); Kia Motors Corporation, Seoul (KR)

(72) Inventors: Yeon Ho Kim, Seoul (KR); Jae Yeon Kim, Gyeonggi-do (KR); Wan Je Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 111 days.

(21) Appl. No.: 15/946,916

(22) Filed: Apr. 6, 2018

(65) Prior Publication Data

US 2019/0168568 A1 Jun. 6, 2019

(30) Foreign Application Priority Data

Dec. 4, 2017 (KR) .................. 10-2017-0164948

(51) Int. Cl.
*B60H 1/00* (2006.01)
*B60L 58/26* (2019.01)
*B60L 58/33* (2019.01)

(52) U.S. Cl.
CPC ..... *B60H 1/00278* (2013.01); *B60H 1/00471* (2013.01); *B60H 1/00735* (2013.01); *B60H 1/00828* (2013.01); *B60L 58/26* (2019.02); *B60L 58/33* (2019.02); *B60H 2001/003* (2013.01); *B60L 2240/36* (2013.01)

(58) Field of Classification Search
CPC ............ B60H 1/00278; B60H 1/00735; B60H 1/00471; B60H 1/00828; B60L 11/1892; B60L 2240/36
USPC ........................................................... 417/22
See application file for complete search history.

(56) References Cited

U.S. PATENT DOCUMENTS

| | | | |
|---|---|---|---|
| 2004/0223851 A1* | 11/2004 | Shiozaki ................. | F01P 7/042 417/15 |
| 2016/0131018 A1* | 5/2016 | Kwon ....................... | F01P 5/14 417/22 |
| 2016/0325729 A1* | 11/2016 | Askerdal ................. | B60L 50/10 |

(Continued)

FOREIGN PATENT DOCUMENTS

KR   10-2017-0069079   6/2017

*Primary Examiner* — Thomas G Black
*Assistant Examiner* — Wae L Louie
(74) *Attorney, Agent, or Firm* — Mintz Levin Cohn Ferris Glovsky and Popeo, P.C.; Peter F. Corless (57) ABSTRACT

A cooling fan control method for a vehicle is provided. The method includes turning on a starting of the vehicle and sensing a stack temperature. A first required speed of first and second cooling fans required by the stack radiator is set and a temperature of an electrical equipment is sensed to set a second required speed of the first cooling fan. When an air conditioner is operated; an air conditioner pressure is sensed and a second required speed of the second cooling fan required by the condenser is set. The method then compares the required speeds as well as a resonance frequency RPM to determine different setting conditions of the fans. The operation of the fans is complete when the coolant temperature and an air conditioner pressure of the stack and the electrical equipment are within a predetermined setting value.

15 Claims, 3 Drawing Sheets

(56) References Cited

U.S. PATENT DOCUMENTS

2018/0162374 A1\* 6/2018 Colavincenzo ......... B60L 58/20
2019/0168568 A1\* 6/2019 Kim .................. B60H 1/00278

\* cited by examiner

COOLING FAN CONTROL METHOD FOR VEHICLE

CROSS-REFERENCE TO RELATED APPLICATION

This application claims priority to and the benefit of Korean Patent Application No. 10-2017-0164948 filed in the Korean Intellectual Property Office on Dec. 4, 2017, the entire contents of which are incorporated herein by reference.

BACKGROUND

(a) Field of the Invention

The present invention relates to a cooling fan control method for a vehicle, and more particularly, to a cooling fan control method for a vehicle that minimizes a consumption power by controlling an operation of a cooling fan with a dual structure in a cooling module in an electric vehicle based on a state of the vehicle.

(b) Description of the Related Art

Nowadays, while interest in energy efficiency and environment pollution increases, development of an environmentally-friendly vehicle capable of replacing an internal combustion engine vehicle is in demand. An electric vehicle that is driven using a fuel cell or electricity is a type of environmentally friendly vehicle. Particularly, in the electric vehicle, a stack radiator cools the fuel cell or the battery, an electrical equipment radiator cools electrical equipment, a condenser, and a cooling module including the cooling fan are disposed in front of the vehicle. This cooling module efficiently cools the fuel cell or the battery, and the electrical equipment depending on a running state of the vehicle and the operation of an air conditioner system. It is thus required to secure performance to improve a cooling performance of the air conditioner system.

However, to ensure the performance of the cooling module, a capacity of the cooling fan must be increased and the cooling fan must be efficiently controlled, however it is difficult to ensure a mounting space in the limited engine compartment space such that there is a limit on the capacity increasing, and a required cooling temperature of each of the constituent elements is different from each other. Accordingly, there is a drawback in that it is difficult to control the cooling fan to correspond to the required cooling temperature of each of the constituent elements. Additionally, among the required cooling temperatures of the constituent elements, when operating the cooling fan based on a maximum cooling temperature, the other constituent elements are cooled unnecessarily, and the power consumption of the cooling fan is increased which thus decreases a max travel distance of the vehicle.

The above information disclosed in this section is merely for enhancement of understanding of the background of the invention and therefore it may contain information that does not form the prior art that is already known in this country to a person of ordinary skill in the art.

SUMMARY

Accordingly, the present invention provides a method for controlling a cooling fan for a vehicle which increases a travel distance of the vehicle and prevents the unnecessary power consumption by minimizing the power consumption of the cooling fan through an independent control of the operation of each cooling fan by comparing required speeds of the cooling fan of the constituent elements when operating the cooling fan provided in dual in the cooling module based on the running state and the operation of the air conditioner in the electric vehicle.

A cooling fan control method for a vehicle according to an exemplary embodiment of the present invention is provided to adjust an operation speed of first and second cooling fans based on a running state and an operation of an air conditioner of a vehicle in a cooling module including a stack radiator, an electrical equipment radiator disposed in front of the stack radiator, a condenser disposed in parallel with reference to a width direction of the electrical equipment radiator and the vehicle, and the first and the second cooling fans disposed in positions respectively corresponding to the electrical equipment radiator and the condenser in rear of the stack radiator.

In particular, the method may include turning on a vehicle to be driven; sensing a stack temperature and setting a first required speed A of the first and second cooling fans required by the stack radiator; sensing a temperature of an electrical equipment and setting a second required speed B of the first cooling fan required by the electrical equipment radiator; determining whether the air conditioner is operated; sensing an air conditioner pressure and setting a second required speed C of the second cooling fan required by the condenser when the air conditioner is operated; and determining whether the first required speed A of the first and second cooling fans is greater than or equal to the second required speed B of the first cooling fan and whether the first required speed A of the first and second cooling fan is greater than or equal to the second required speed C of the second cooling fan.

Additionally, the method may include setting the first and second cooling fans as the first required speed A when the condition is satisfied in the determination process; determining whether an absolute value for a difference of a predetermined required speed of the first cooling fan and a predetermined required speed of the second cooling fan is greater than or equal to a resonance frequency revolutions per minute (RPM) ($\alpha$); operating the first and second cooling fans with the predetermined required speed when the condition is satisfied in the determination of whether an absolute value for a difference of a predetermined required speed of the first cooling fan and a predetermined required speed of the second cooling fan is greater than or equal to a resonance frequency RPM ($\alpha$); determining whether a coolant temperature and an air conditioner pressure of a stack and an electrical equipment are within a predetermined setting value; and completing the control when the coolant temperature and the air conditioner pressure of the stack and the electrical equipment are within a predetermined setting value.

In response to determining that the air conditioner is not operated, a step of determining whether the first required speed A of the first and second cooling fans is greater than or equal to the second required speed B of the first cooling fan may be performed. In addition, in the determination of whether the first required speed A of the first and second cooling fans is greater than or equal to the second required speed B of the first cooling fan, when the condition is satisfied (e.g., the greater than or equal to condition), the setting of the first and second cooling fans as the first required speed A may be performed and the process may return to determining whether the absolute value for the difference of the predetermined required speed of the first cooling fan and the predetermined required speed of the second cooling fan is greater than or equal to the resonance frequency RPM (α).

In the determination of whether the first required speed A of the first and second cooling fans is greater than or equal to the second required speed B of the first cooling fan, when the condition is not satisfied (e.g., the first required speed A of the fans is less than the second required speed B), the method may include setting the first cooling fan as the second required speed B of the first cooling fan and setting the second cooling fan as the first required speed A, and the process may return to determining whether the absolute value for the difference of the predetermined required speed of the first cooling fan and the predetermined required speed of the second cooling fan is greater than or equal to the resonance frequency RPM (α).

In the determination of whether the first required speed A of the first and second cooling fans is greater than or equal to the second required speed B of the first cooling fan and the first required speed A of the first and second cooling fan is greater than or equal to the second required speed C of the second cooling fan, when the condition is not satisfied, a determination of whether the first required speed A of the first and second cooling fan is greater than or equal to the second required speed B of the first cooling fan and is less than the second required speed C of the second cooling fan may be performed.

Additionally, in the determination of whether the first required speed A of the first and second cooling fan is greater than or equal to the second required speed B of the first cooling fan and is less than the second required speed C of the second cooling fan, when the condition is satisfied, a setting the first cooling fan as the first required speed A and the second cooling fan as the second required speed C of the second cooling fan may be performed, and the process may return to the determination of whether the absolute value for the difference of the predetermined required speed of the first cooling fan and the predetermined required speed of the second cooling fan is greater than or equal to the resonance frequency RPM (α).

In the determination of whether the first required speed A of the first and second cooling fan is greater than or equal to the second required speed B of the first cooling fan and is less the second required speed C of the second cooling fan, when the condition is not satisfied, a determination of whether the first required speed A of the first and second cooling fan is less than the second required speed B of the first cooling fan and is greater than or equal to the second required speed C of the second cooling fan may be performed.

Further, in the determination of whether the first required speed A of the first and second cooling fan is less than the second required speed B of the first cooling fan and is greater than or equal to the second required speed C of the second cooling fan, when the condition is satisfied, a setting of the first cooling fan as the second required speed B of the first cooling fan and the second cooling fan as the first required speed A of the second cooling fan may be performed, and the process may return to determining whether the absolute value for the difference of the predetermined required speed of the first cooling fan and the predetermined required speed of the second cooling fan is greater than or equal to the resonance frequency RPM (α).

In the determination of whether the first required speed A of the first and second cooling fan is less than the second required speed B of the first cooling fan and is greater than or equal to the second required speed C of the second cooling fan, when the condition is not satisfied, a determination of whether the first required speed A of the first and second cooling fan is less than the second required speed B of the first cooling fan and the second required speed B of the first cooling fan is less than the second required speed C of the second cooling fan may be performed.

In the determination of whether the first required speed A of the first and second cooling fans is less than the second required speed B of the first cooling fan and the first required speed A of the first and second cooling fan is less than the second required speed C of the second cooling fan, when the condition is satisfied, the first cooling fan may be set as the second required speed B of the first cooling fan, the second cooling fan may be set as the second required speed C of the second cooling fan, and the process may return to determining whether the absolute value for the difference of the predetermined required speed of the first cooling fan and the predetermined required speed of the second cooling fan is greater than or equal to the resonance frequency RPM (α).

In the determination of whether the first required speed A of the first and second cooling fan is less than the second required speed B of the first cooling fan and the first required speed A of the first and second cooling fan is less than the second required speed C of the second cooling fan, when the condition is not satisfied, the process may return to setting the first and second cooling fan as the first required speed A.

In the determination of whether the absolute value for the difference of the predetermined required speed of the first cooling fan and the predetermined required speed of the second cooling fan is greater than or equal to the resonance frequency RPM (α), when the condition is not satisfied, a determination of whether the required speed of the predetermined the first cooling fan is greater than or equal to the predetermined required speed of the second cooling fan may be performed.

Further, in the determination of whether the predetermined required speed of the first cooling fan is greater than or equal to the predetermined required speed of the second cooling fan, when the condition is satisfied, the first cooling fan may be operated with the predetermined required speed, and the second cooling fan may be operated with a speed in which the resonance frequency RPM (α) is subtracted from the predetermined required speed of the first cooling fan, and the process may return to the determination of whether the coolant temperature and the air conditioner pressure of the stack and the electrical equipment are within the predetermined setting value.

In the determination of whether the predetermined required speed of the first cooling fan is greater than or equal to the predetermined required speed of the second cooling fan, when the condition is not satisfied, the second cooling fan may be operated with the predetermined required speed, the first cooling fan may be operated with a speed in which the resonance frequency RPM (α) is subtracted from the predetermined required speed of the second cooling fan, and the process may return to the determination of whether the coolant temperature and the air conditioner pressure of the stack and the electrical equipment are within the predetermined setting value.

In the determination of whether the coolant temperature and the air conditioner pressure of the stack and the electrical equipment are within the predetermined setting value, when the condition is not satisfied, the process may return to the sensing of the stack temperature and setting the first required speed A of the first and second cooling fans required by the stack radiator.

Accordingly, when the method for controlling the cooling fan for the vehicle according to an exemplary embodiment of the present invention configured as above described is applied, when operating the first and the second cooling fans provided in dual in the cooling module based the running state of the vehicle in the electric vehicle according to the running state and the air conditioner operation, by independently adjusting the operation speed of the first and the second cooling fans by comparing the cooling fan required speed of each of the constituent elements, the unnecessary power consumption may be prevented by minimizing the power consumption of the first and second cooling fans and the travel distance of the vehicle may be increased.

Additionally, the present invention may prevent each cooling fan from being operated in the resonance frequency when being operated with the predetermined required speed, thereby improving the noise, vibration, and harshness (NVH) performance of the vehicle. Since the performance of the cooling module may be ensured without the capacity increasing of the first and the second cooling fans, a mounting characteristic of the cooling module may be improved in the limited mounting space, and the operability and the operation efficiency of the stack, the electrical equipment, and the air conditioner system mounted in the vehicle may be improved.

BRIEF DESCRIPTION OF THE DRAWINGS

The objects, features and advantages of the present invention will be more apparent from the following detailed description in conjunction with the accompanying drawings, in which.

DESCRIPTION OF SYMBOLS

1: cooling module
3: stack radiator
5: electrical equipment radiator
7: condenser
10: first cooling fan
20: second cooling fan

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. Prior to the detailed descriptions, while this invention will be described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Components unrelated to the description will be omitted to obviously describe the present invention, and like reference numerals will be used to describe like components throughout the present specification. Further, in the drawings, the sizes and the thicknesses of the components are exemplarily provided for the convenience of description, the present invention is not limited those shown in the drawings, and the thicknesses are exaggerated to clearly show several parts and regions.

Throughout this specification and the claims which follow, when it is described that an element is "coupled" to another element, the element may be "directly coupled" to the other element or "electrically coupled" to the other element through a third element. Furthermore, each of terms, such as ' . . . unit", " . . . means', ' . . . part', and ' . . . member' described in the specification, mean a unit of a comprehensive element that performs at least one function or operation.

Figure 1:
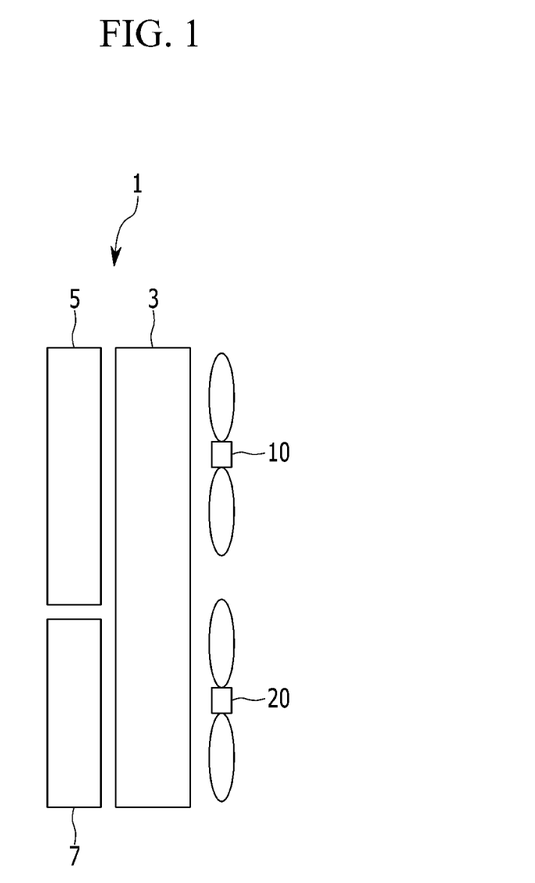
FIG. 1 is a schematic diagram of a cooling module applied to method for controlling a cooling fan for a vehicle according to an exemplary embodiment of the present invention.
Figure 2A:
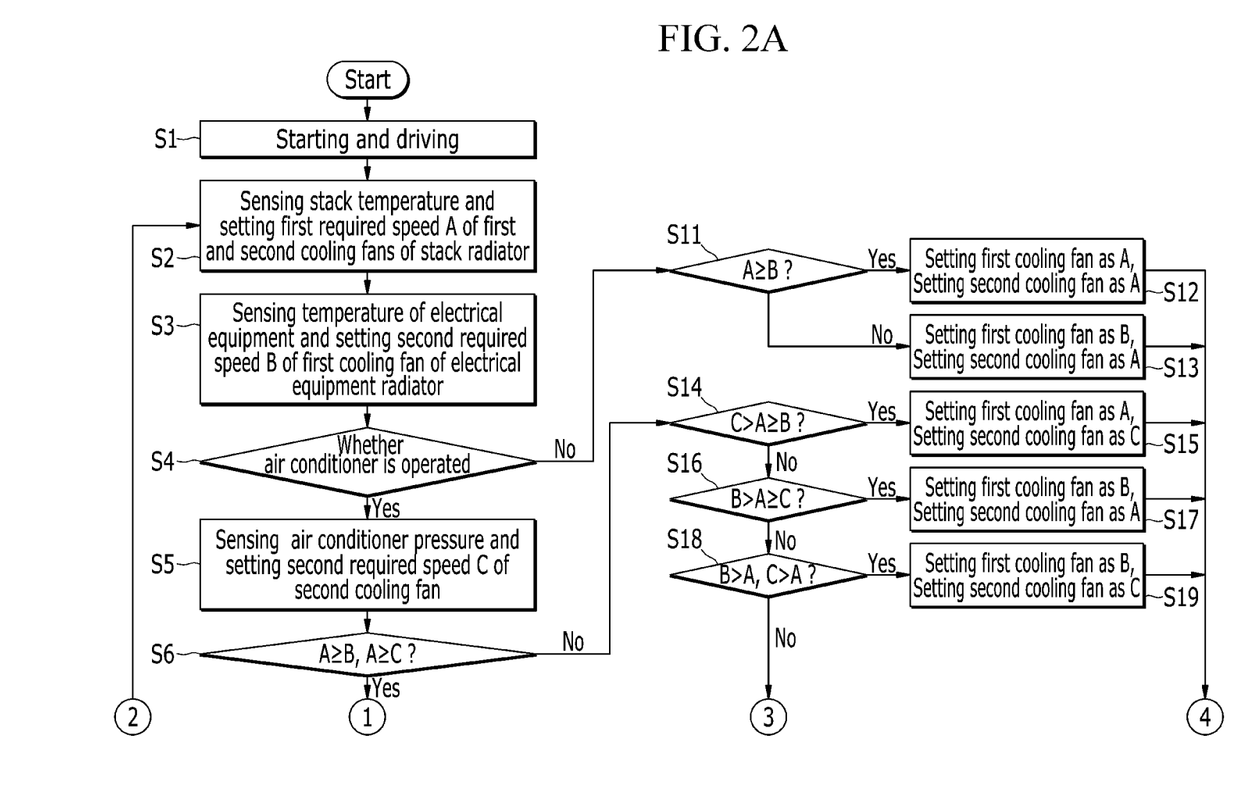
FIGS. 2A and 2B are a control flowchart to illustrate a method for controlling a cooling fan for a vehicle according to an exemplary embodiment of the present invention.
Figure 2B:
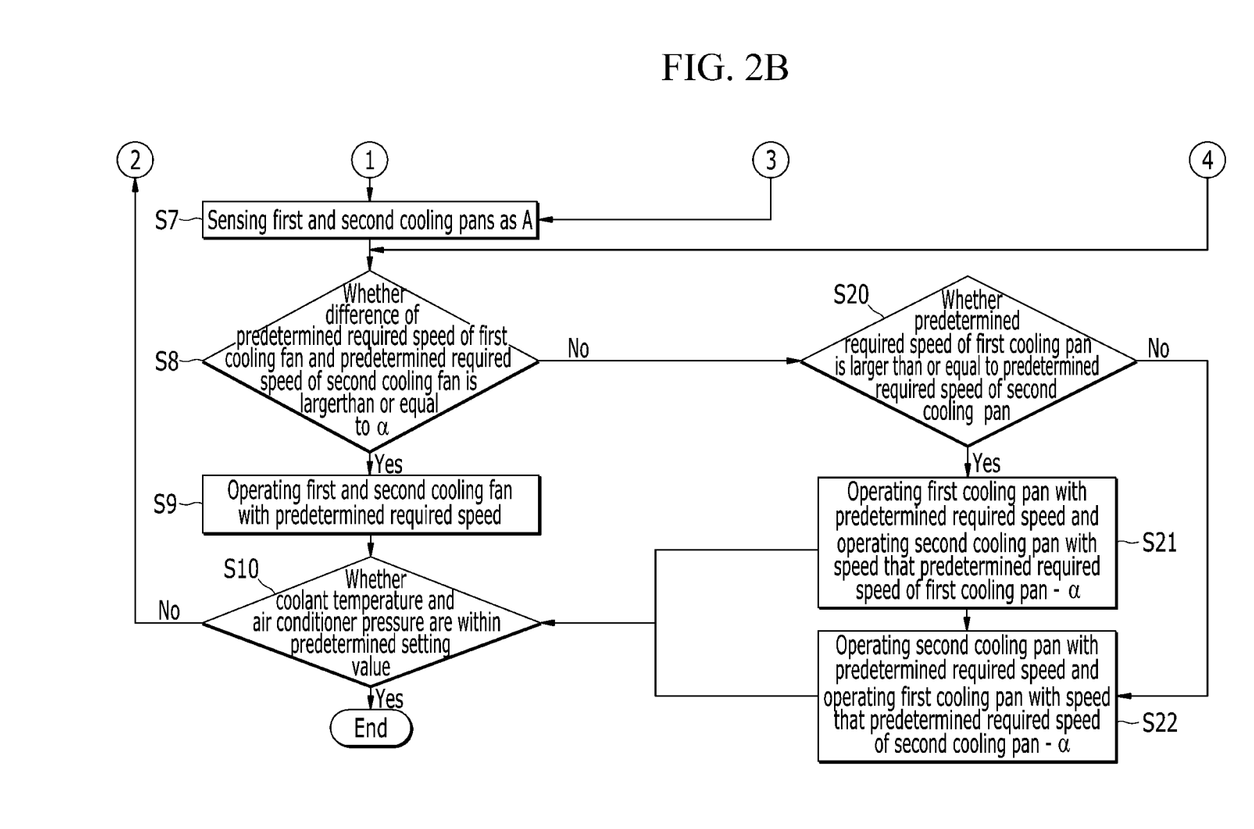

FIG. 1 is a schematic diagram of a cooling module applied to method for controlling a cooling fan for a vehicle according to an exemplary embodiment of the present invention and FIGS. 2A and 2B are a control flowchart to illustrate a method for controlling a cooling fan for a vehicle according to an exemplary embodiment of the present invention. The method described herein below may be executed by a controller within the vehicle. Referring to FIG. 1, a method for controlling a cooling fan for a vehicle according to an exemplary embodiment of the present invention is applied to an electric vehicle.

Particularly, a cooling module 1 may be installed in a front region of the electric vehicle and the cooling module 1 may include a stack radiator 3, an electrical equipment radiator 5, a condenser 7, and first and second cooling fans 10 and 20. The stack radiator 3 may be configured to supply a coolant to a fuel cell stack. An electrical equipment radiator 5 may be disposed to supply the coolant to the electrical equipment on the front first side of the stack radiator. The condenser 7 may be disposed to condense the coolant of an air conditioner system on the front second side of the stack radiator 3. In other words, the electrical equipment radiator 5 and the condenser 7 may be disposed in parallel with reference to a width direction of the vehicle.

Additionally, the first and second cooling fans 10 and 20 may be mounted at positions respectively corresponding to the electrical equipment radiator 5 and the condenser 7 in the rear side of the stack radiator 3. In the configuration of the cooling module 1, the method for controlling the cooling fan according to an exemplary embodiment of the present invention is applied to adjust the operation speed of the first cooling fan 10 and the second cooling fan 20 based on the running state and the operation of the air conditioner system of the vehicle.

In the method for controlling the cooling fan for the vehicle according to an exemplary embodiment of the present invention, as shown in FIGS. 2A and 2B, when a starting of the vehicle is turned on for the vehicle to be driven (S1), the temperature of the stack may be sensed (e.g., using a temperature sensor), and a first required speed A of the first and second cooling fans 10 and 20 required by the stack radiator 3 may be set (S2). The temperature of the electrical equipment mounted within the vehicle may then be sensed (e.g., using a temperature sensor) and a second required speed B of the first cooling fan 10 required by the electrical equipment radiator 5 may be set (S3). Further, whether the air conditioner in the vehicle is operated may be determined (S4). In response to determining that the air conditioner of the vehicle is operated, an air conditioner pressure may be sensed (e.g., using a sensor) and a second required speed C of the second cooling fan 20 required by the condenser 7 may be set (S5). When the setting of the second required speed C of the second cooling fan 20 is completed, whether the first required speed A of the first and second cooling fans 10 and 20 is equal to or greater than the second required speed B of the first cooling fan 10 and whether the first required speed A of the first and second cooling fans 10 and 20 is equal to or greater than the second required speed C of the second cooling fan 20 may be determined (S6).

When the condition is satisfied (e.g., when the equal to or greater than conditions of S6 are both satisfied or true), the speed of the first and second cooling fans 10 and 20 may be set as the first required speed A (S7). Additionally, whether an absolute value for a difference of a predetermined required speed of the first cooling fan 10 and a predetermined required speed of the second cooling fan 20 is greater than or equal to a resonance frequency RPM ($\alpha$) may be determined (S8). When the condition is satisfied (e.g., the S8 greater than or equal to condition), the first and second cooling fans 10 and 20 may be operated with the predetermined required speed A, and whether the coolant temperature and the air conditioner pressure of the stack and the electrical equipment are within a predetermined setting value may be determined (S10).

In response to determining that the coolant temperature and the air conditioner pressure of the stack and the electrical equipment are within the predetermined setting value, the control of the cooling fan may be stopped. In particular, in the determination of the operation of the air conditioner (S4), in response to determining that the air conditioner is not operated, whether the first required speed A of the first and second cooling fans 10 and 20 is greater than or equal to the second required speed B of the first cooling fan 10 may be determined (S11). When the condition is satisfied (e.g., the equal to or greater than condition of S11), the first and second cooling fans 10 and 20 may be operated with the first required speed A (S12).

The process may then return to the determination of whether the absolute value for the difference of the predetermined required speed of the first cooling fan 10 and the predetermined required speed of the second cooling fan 20 is greater than or equal to the resonance frequency RPM ($\alpha$) (S8). However, when the first required speed A of the first and second cooling fans 10 and 20 is less than the second required speed B of the first cooling 10 (e.g., when the condition of S11 is not satisfied), the first cooling fan 10 may be set as the second required speed B of the first cooling fan 10, the second cooling fan 20 may be set as the first required speed A (S13), and that the process may return to a determination of whether the absolute value for the difference of the predetermined required speed of the first cooling fan 10 and the predetermined required speed of the second cooling fan 20 is greater than or equal to the resonance frequency RPM ($\alpha$) (S8).

In other words, in the method for controlling the cooling fan for the vehicle according to an exemplary embodiment of the present invention, by independently operating the first and second cooling fans 10 and 20 with the greater required speed based on a comparison of the required speed of the first and the second cooling fans 10 and 20 required to cool the stack radiator 10 based on the running state of the vehicle and the required speed of the first cooling fan 10 required to cool the electrical equipment radiator 5, the cooling module 1 may be cooled more efficiently.

Meanwhile, in the determination of whether the first required speed A of the first and second cooling fans 10 and 20 is equal to or greater than the second required speed B of the first cooling fan 10 and the first required speed A of the first and second cooling fans 10 and 20 is equal to or greater than the second required speed C of the second cooling fan 20, when the condition is not satisfied, whether the first required speed A of the first and second cooling fans 10 and 20 is equal to or greater than the second required speed B of the first cooling fan 10 is less than the second required speed C of the second cooling fan 20 may be determined (S14). In other words, the condition not being satisfied indicates that the first required speed A of the first and second cooling fans 10 and 20 is less than the second required speed B of the first cooling fan 10 and the first required speed A of the first and second cooling fans 10 and 20 is less than the second required speed C of the second cooling fan 20.

When the condition is satisfied (e.g., the condition of S14 is true), the first cooling fan 10 may be set as the first required speed A, and the second cooling fan 20 may be set as the second required speed C of the second cooling fan 20 (S15). Further, when the required speed setting of the first cooling fan 10 and the second cooling fan 20 is complete, the process may return to determining whether the absolute value for the difference of the predetermined required speed of the first cooling fan 10 and the predetermined required speed of the second cooling fan 20 is greater than or equal to the resonance frequency RPM ($\alpha$) (S8).

However, in determination of whether the first required speed A of the first and second cooling fans 10 and 20 is greater than or equal to the second required speed B of the first cooling fan 10 and is less than the second required speed C of the second cooling fan 20 (S14), if the condition is not satisfied, whether the first required speed A of the first and second cooling fans 10 and 20 is less than the second required speed B of the first cooling fan 10 and is greater than or equal to the second required speed C of the second cooling fan 20 may be determined (S16). In other words, the condition not being satisfied (e.g., in S14) refers to the first required speed A of the first and second cooling fans 10 and 20 being less than the second required speed B of the first cooling fan 10 and equal to or greater than the second required speed C of the second cooling fan 20.

In addition, when the condition is satisfied (e.g., the condition of S16), the first cooling fan 10 may be set as the second required speed B of the first cooling fan 10, and the second cooling fan 20 may be set as the first required speed A of the second cooling fan 20 (S17). The process may then return to determining whether the absolute value for the difference of the predetermined required speed of the first cooling fan 10 and the predetermined required speed of the second cooling fan 20 is greater than or equal to the resonance frequency RPM ($\alpha$) (S8).

However, in the determination of whether the first required speed A of the first and second cooling fans 10 and 20 is less than the second required speed B of the first cooling fan 10 and is greater than or equal to the second required speed C of the second cooling fan 20 (S16), when the condition is not satisfied, whether the first required speed A of the first and second cooling fans 10 and 20 is less than the second required speed B of the first cooling fan 10 and the first required speed A of the first and second cooling fan 10 and 20 is less than the second required speed C of the second cooling fan 20 (S18) may be determined.

In particular, when the condition is satisfied (e.g., of S18) and the first required speed A of the first and second cooling fans 10 and 20 is less than the second required speed B of the first cooling fan 10 and the first required speed A of the fans 10 and 20 is less than the second required speed C of the second cooling fan 20, the first cooling fan 10 may be set as the second required speed B of the first cooling fan 10, and the second cooling fan 20 may be set as the second required speed C of the second cooling fan 20 (S19). Further, the process may then return to determining whether the absolute value for the difference of the predetermined required speed of the first cooling fan 10 and the predetermined required speed of the second cooling fan 20 is larger than or equal to the resonance frequency RPM ($\alpha$) (S8).

However, in the determination of whether the first required speed A of the first and second cooling fans 10 and 20 is less than the second required speed B of the first cooling fan 10 and the first required speed A of the first and second cooling fan 10 and 20 is less than the second required speed C of the second cooling fan 20, when the condition is not satisfied, the process may return to setting the first and second cooling fans 10 and 20 as the first required speed A (S7).

Meanwhile, in the determination of whether the absolute value for the difference of the predetermined required speed of the first cooling fan 10 and the predetermined required speed of the second cooling fan 20 is greater than or equal to the resonance frequency RPM ($\alpha$) (S8), when the condition is not satisfied, whether the predetermined required speed of the first cooling fan 10 is greater than or equal to the predetermined required speed of the second cooling fan 20 may be determined (S20). When the condition is satisfied (e.g., the condition of S20), the first cooling fan 10 may be operated with the predetermined required speed, the second cooling fan 20 may be operated with a speed at which the resonance frequency RPM ($\alpha$) is subtracted from the predetermined required speed of the first cooling fan 10 (S21).

Further, the process may then return to determining whether the coolant temperature and the air conditioner pressure of the stack and the electrical equipment is within the predetermined setting value (S10). However, in the determination of whether the predetermined required speed of the first cooling fan 10 is greater than or equal to the predetermined required speed of the second cooling fan 20 (S20), when the condition is not satisfied, the second cooling fan 20 may be operated with the predetermined required speed, and the first cooling fan 10 may be operated with the speed at which the resonance frequency RPM ($\alpha$) is subtracted from the predetermined required speed of the second cooling fan 20 (S22).

The process may then return to determining whether the coolant temperature and the air conditioner pressure of the stack and the electrical equipment is within the predetermined setting value (S10). In the determination of whether the coolant temperature and the air conditioner pressure of the stack and the electrical equipment is within the predetermined setting value (S10), when the condition is not satisfied, that the process may return to sensing the temperature of the stack and setting the first required speed A of the first and second cooling fans 10 and 20 required by the stack radiator (S2).

In other words, since the cooling fan control method for the vehicle according to an exemplary embodiment of the present invention compares the required speed of the first and second cooling fans 10 and 20 required to cool the stack radiator 3, the required speed of the first cooling fan 10 required to cool the electrical equipment radiator 5, and the required speed of the second cooling fan 20 required to cool the condenser 7 based on the running state of the vehicle and the operation of the air-conditioner while performing the above-processes, the first and second cooling fans 10 and 20 may be operated independently with the required speed, thereby cooling the cooling module 1 more efficiently.

Accordingly, when the method for controlling the cooling fan for the vehicle according to an exemplary embodiment of the present invention configured as above described is applied, when operating the first and the second cooling fans 10 and 20 provided in dual in the cooling module 1 based the running state of the vehicle in the electric vehicle according to the running state and the air conditioner operation, by independently adjusting the operation speed of the first and the second cooling fans 10 and 20 by comparing the cooling fan required speed of each of the constituent elements, the unnecessary power consumption may be prevented by minimizing the power consumption of the first and second cooling fans 10 and 20 and the travel distance of the vehicle may be increased.

Additionally, the present invention prevents the first and second cooling fans 10 and 20 from being operated in the resonance frequency region when being operated with the predetermined required speed, thereby improving the NVH performance of the vehicle. The performance of the cooling module may also be ensured without the capacity increasing of the first and the second cooling fans, a mounting characteristic of the cooling module may be improved in the limited mounting space, and the operability and the operation efficiency of the stack, the electrical equipment, and the air conditioner system mounted in the vehicle may be improved.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a cooling fan for a vehicle to adjust an operation speed of a first cooling fan and a second cooling fan disposed in a cooling module based on a running state and an air conditioner operation of the vehicle, wherein the cooling module includes a stack radiator, an electrical equipment radiator disposed in front of the stack radiator, a condenser disposed in parallel with reference to a width direction of the electrical equipment radiator and the vehicle, and the first and second cooling fans provided at positions respectively corresponding of the electrical equipment radiator and the condenser in rear of the stack radiator, comprising:

turning on, by a controller, a starting of the vehicle to be driven;
sensing, by the controller, a stack temperature and setting a first required speed of the first and second cooling fans required by the stack radiator;
sensing, by the controller, a temperature of the electrical equipment and setting a second required speed of the first cooling fan required by the electrical equipment;
determining, by the controller, whether the air conditioner is operated;
sensing, by the controller, an air conditioner pressure and setting a second required speed of the second cooling fan required by the condenser in response to determining that the air conditioner is operated;
determining, by the controller, whether the first required speed of the first and second cooling fans is greater than or equal to the second required speed of the first cooling fan and the first required speed of the first and second cooling fan is greater than or equal to the second required speed of the second cooling fan;
setting, by the controller, the first and second cooling fans as the first required speed when the first required speed of the first and second cooling fans is greater than or equal to the second required speed of the first cooling fan and the first required speed of the first and second cooling fan is greater than or equal to the second required speed of the second cooling fan;
determining, by the controller, whether an absolute value for a difference of a predetermined required speed of the first cooling fan and a predetermined required speed of the second cooling fan is greater than or equal to a resonance frequency revolutions per minute (RPM) ($\alpha$);
operating, by the controller, the first and second cooling fans with the predetermined required speed when the absolute value for the difference of the predetermined required speed of the first cooling fan and the predetermined required speed of the second cooling fan is greater than or equal to the resonance frequency RPM ($\alpha$);
determining, by the controller, whether a coolant temperature and the air conditioner pressure of a stack and the electrical equipment are within a predetermined setting value; and
completing, by the controller, the control of the cooling fans in response to determining that the coolant temperature and the air conditioner pressure of the stack and the electrical equipment are within a predetermined setting value.

2. The cooling fan control method for the vehicle of claim 1, wherein in response to determining that the air conditioner is not operated, the method includes:
determining, by the controller, whether the first required speed of the first and second cooling fans is greater than or equal to the second required speed of the first cooling fan.

3. The cooling fan control method for the vehicle of claim 2, wherein when the first required speed of the first and second cooling fans is greater than or equal to the second required speed of the first cooling fan, the method includes:
setting, by the controller, the first and second cooling fan as the first required speed; and
returning to determining whether the absolute value for the difference of the predetermined required speed of the first cooling fan and the predetermined required speed of the second cooling fan is greater than or equal to the resonance frequency RPM ($\alpha$).

4. The cooling fan control method for the vehicle of claim 2, wherein when the first required speed of the first and second cooling fans is less than the second required speed of the first cooling fan, the method includes:
setting, by the controller, the first cooling fan as the second required speed of the first cooling fan;
setting, by the controller, the second cooling fan as the first required speed; and
returning to determining whether the absolute value for the difference of the predetermined required speed of the first cooling fan and the predetermined required speed of the second cooling fan is greater than or equal to the resonance frequency RPM ($\alpha$).

5. The cooling fan control method for the vehicle of claim 1, wherein when the first required speed of the first and second cooling fans is less than the second required speed of the first cooling fan and the first required speed of the first and second cooling fan is less than the second required speed of the second cooling fan, the method includes:
determining, by the controller, whether the first required speed of the first and second cooling fan is greater than or equal to the second required speed of the first cooling fan and is less than the second required speed of the second cooling fan.

6. The cooling fan control method for the vehicle of claim 5, wherein when the first required speed of the first and second cooling fans is greater than or equal to the second required speed of the first cooling fan and is less than the second required speed of the second cooling fan, the method includes:
setting, by the controller, the first cooling fan as the first required speed and the second cooling fan as the second required speed of the second cooling fan; and
returning to determining whether the absolute value for the difference of the predetermined required speed of the first cooling fan and the predetermined required speed of the second cooling fan greater larger than or equal to the resonance frequency RPM ($\alpha$).

7. The cooling fan control method for the vehicle of claim 5, wherein when the first required speed of the first and second cooling fan is less than the second required speed of the first cooling fan and is equal to or greater than the second required speed of the second cooling fan, the method includes:
determining, by the controller, whether the first required speed of the first and second cooling fan is less than the second required speed of the first cooling fan and is greater than or equal to the second required speed of the second cooling fan.

8. The cooling fan control method for the vehicle of claim 7, wherein when the first required speed of the first and second cooling fan is less than the second required speed of the first cooling fan and is greater than or equal to the second required speed of the second cooling fan, the method includes:
   setting, by the controller, the first cooling fan as the second required speed of the first cooling fan and the second cooling fan as the first required speed of the second cooling fan; and
   returning to determining whether the absolute value for the difference of the predetermined required speed of the first cooling fan and the predetermined required speed of the second cooling fan is greater than or equal to the resonance frequency RPM ($\alpha$).

9. The cooling fan control method for the vehicle of claim 7, wherein when the first required speed of the first and second cooling fans is equal to or greater than than the second required speed of the first cooling fan and is less than the second required speed of the second cooling fan, the method includes:
   determining, by the controller, whether the first required speed of the first and second cooling fan is less than the second required speed of the first cooling fan and the second required speed of the first cooling fan is less than the second required speed of the second cooling fan.

10. The cooling fan control method for the vehicle of claim 9, wherein when the first required speed of the first and second cooling fans is less than the second required speed of the first cooling fan and the first required speed of the first and second cooling fans is less than the second required speed of the second cooling fan, the method includes:
   setting, by the controller, the first cooling fan as the second required speed of the first cooling fan;
   setting, by the controller, the second cooling fan as the second required speed of the second cooling fan; and
   returning to determining whether the absolute value for the difference of the predetermined required speed of the first cooling fan and the predetermined required speed of the second cooling fan is greater than or equal to the resonance frequency RPM ($\alpha$).

11. The cooling fan control method for the vehicle of claim 9, wherein when the first required speed of the first and second cooling fan is equal to or greater than the second required speed of the first cooling fan and the first required speed of the first and second cooling fan is equal to or greater than the second required speed of the second cooling fan, the method includes:
   returning to setting the first and second cooling fan as the first required speed.

12. The cooling fan control method for the vehicle of claim 1, wherein when the absolute value for the difference of the predetermined required speed of the first cooling fan and the predetermined required speed of the second cooling fan is less than the resonance frequency RPM ($\alpha$), the method includes:
   determining, by the controller, whether the required speed of the predetermined the first cooling fan is greater than or equal to the predetermined required speed of the second cooling fan.

13. The cooling fan control method for the vehicle of claim 12, wherein when the predetermined required speed of the first cooling fan is greater than or equal to the predetermined required speed of the second cooling fan, the method includes:
   operating, by the controller, the first cooling fan with the predetermined required speed; and
   operating, by the controller, the second cooling fan with a speed at which the resonance frequency RPM ($\alpha$) is subtracted from the predetermined required speed of the first cooling fan; and
   returning to determining whether the coolant temperature and the air conditioner pressure of the stack and the electrical equipment are within the predetermined setting value.

14. The cooling fan control method for the vehicle of claim 12, wherein when the predetermined required speed of the first cooling fan is less than the predetermined required speed of the second cooling fan, the method includes:
   operating, by the controller, the second cooling fan with the predetermined required speed;
   operating, by the controller, the first cooling fan with a speed at which the resonance frequency RPM ($\alpha$) is subtracted from the predetermined required speed of the second cooling fan; and
   returning to determining whether the coolant temperature and the air conditioner pressure of the stack and the electrical equipment are within the predetermined setting value.

15. The cooling fan control method for the vehicle of claim 1, wherein when the coolant temperature and the air conditioner pressure of the stack and the electrical equipment are beyond the predetermined setting value, the method includes:
   returning to sensing the stack temperature and setting the first required speed of the first and second cooling fans required by the stack radiator.

* * * * *